United States Patent [19]

Chen et al.

[11] Patent Number: 5,416,157
[45] Date of Patent: May 16, 1995

[54] PROCESS FOR IMPROVING MECHANICAL SHEAR STABILITY OF ACRYLIC ENTERIC POLYMERS

[75] Inventors: Robert G. Chen, Kingsport; Nancy M. Clipse, Mount Carmel, both of Tenn.

[73] Assignee: Eastman Chemical Company, Kingsport, Tenn.

[21] Appl. No.: 118,904

[22] Filed: Sep. 9, 1993

[51] Int. Cl.⁶ .............. C08K 5/41; C08K 5/05; C08L 33/12; C08F 4/46
[52] U.S. Cl. ................... 524/745; 524/765; 524/767; 524/833; 424/490; 526/181; 526/216; 526/225; 526/229; 526/232.1; 526/234; 526/318.4
[58] Field of Search .............. 524/745, 560, 767, 833, 524/765; 526/201, 216, 225, 229, 232.1, 318.4, 181, 234; 424/490

[56] References Cited

U.S. PATENT DOCUMENTS

| | | | |
|---|---|---|---|
| 3,035,004 | 5/1962 | Glavis | 524/833 |
| 4,017,647 | 4/1977 | Ohno et al. | 427/3 |
| 4,081,418 | 3/1978 | Barua et al. | 260/29.6 |
| 4,112,215 | 9/1978 | Boensler et al. | 528/503 |
| 4,138,380 | 2/1979 | Barabas | 524/833 |
| 4,177,177 | 12/1979 | Vanderhoff et al. | 260/29.2 M |
| 4,196,272 | 4/1980 | Coretta et al. | 526/318.4 |
| 4,330,338 | 5/1982 | Banker | 106/197 C |
| 4,462,839 | 7/1984 | McGinley et al. | 106/198 |
| 4,518,433 | 5/1985 | McGinley et al. | 106/180 |
| 4,775,536 | 10/1988 | Patell | 424/471 |
| 4,914,140 | 4/1990 | Saitoh et al. | 526/318.4 |
| 5,025,004 | 6/1991 | Wu et al. | 514/165 |
| 5,047,258 | 9/1991 | Belanger et al. | 427/3 |
| 5,118,749 | 6/1992 | Knutson | 524/560 |
| 5,182,327 | 1/1993 | Biale | 524/560 |
| 5,292,522 | 3/1994 | Petereit et al. | 424/490 |

FOREIGN PATENT DOCUMENTS 2057876 4/1991 United Kingdom.

OTHER PUBLICATIONS

Lehmann and Dreher, Pharm. Ind., vol. 34, No. 11a, pp. 894–899 (1972).
N. Sütterlin, Makronol. Chem., Suppl. 10/11, 403–418 (1985).
K. Lehmann, APV-Informationdienst, vol. 18, No. 1, 48–60 (1972).
H. Kast, Makromol. Chem., Suppl. 10/11, 447–461 (1985).
E. S. Daniels & A. Klein, Progress in Organic Coatings, 19, 359–378 (1991).
K. Lehmann, Acta Pharmaceutica Technologica, 31 (2), (1985).
J. P. Dechesne et al, J. Pharm, Belg., vol. 37, No. 4, pp. 273–282, (1982).
J. Colloid Science, 6, 108 (1951).
J. A. Seitz, "Encyclopedia of Pharmaceutical Technology", vol. 1, Edited by J. Swarbrick and J. Boylan, 337 (1988).
G. S. Banker and G. E. Peck, Pharmaceutical Technology, 5 (4), 55–61 (1981).
R. E. Pondell, Drug Development and Industrial Pharmacy, 10 (2), 191–202 (1984).
M. B. Davis, G. E. Peck and G. S. Banker, Drug Development and Industrial Pharmacy, 12 (10), 1419–1448, (1986).
F. Gumowski, E. Doelker, and R. Gurny, Pharmaceutical Technology, 11 (2), 26–32, (1987).
R. K. Chang, C. H. Hsiao, and J. R. Robinson, Pharmaceutical Technology, 11 (3), 56–68, (1987).
J. Gardon, High Polymers, vol. 29, Wiley, New York, 143 (1977).
U.S.P. XXII/NF XVII, U.S. Pharmacoplial Convention, Inc., 1990, as USP Methacrylic Acid Copolymer—Type C.

Primary Examiner—Peter A. Szekely
Attorney, Agent, or Firm—Bernard J. Graves, Jr.; Harry J. Gwinnell

[57] ABSTRACT

Provided is a process useful for making acrylic polymers of methacrylic acid having improved shear stability. The process provides polymers useful as enteric coatings for medicaments having improved coating efficiency of pharmaceutical forms. Also provided are medicaments in solid form coated with said polymers.

4 Claims, 1 Drawing Sheet

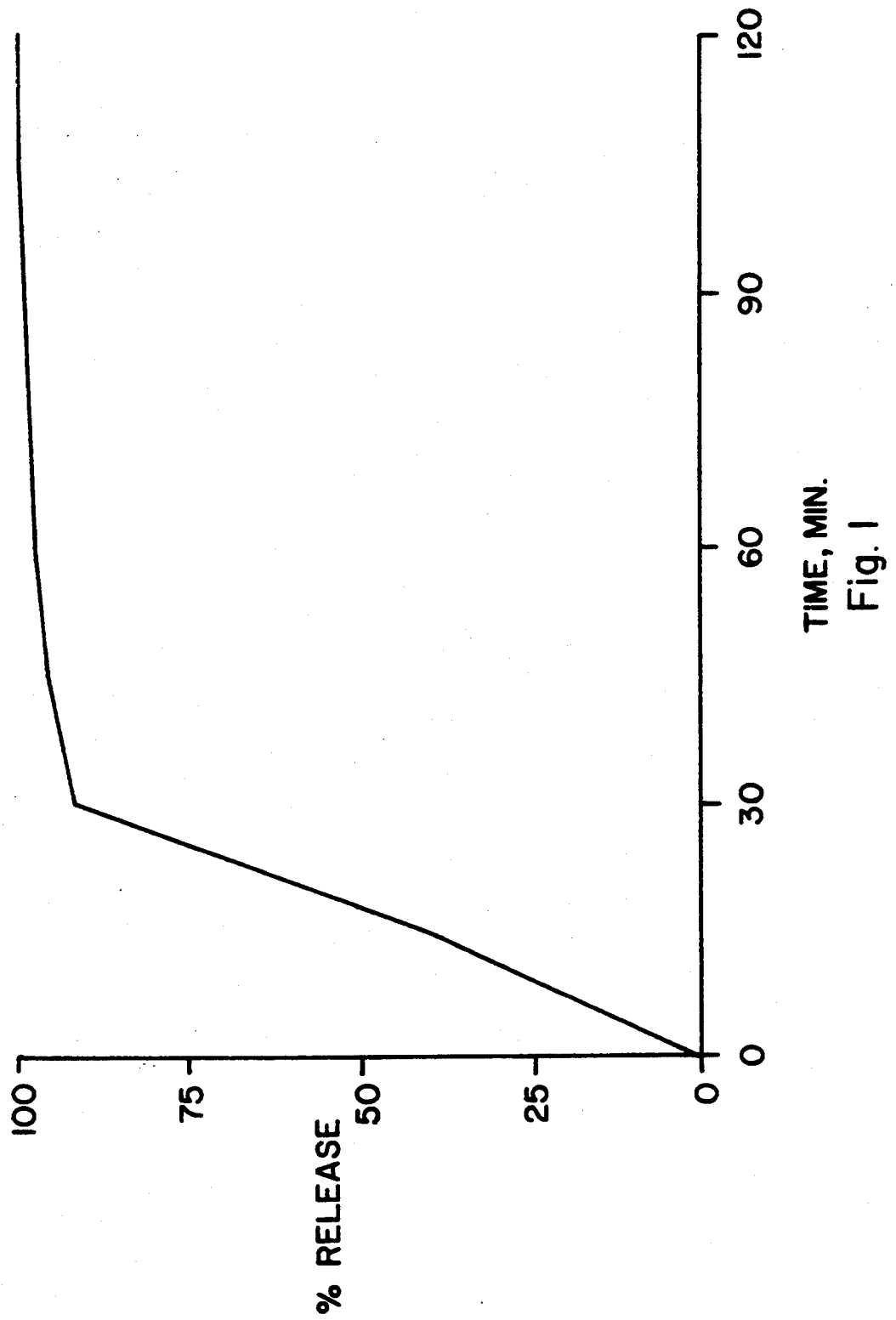

PROCESS FOR IMPROVING MECHANICAL SHEAR STABILITY OF ACRYLIC ENTERIC POLYMERS

FIELD OF THE INVENTION

This invention relates to a process for making polymers of methacrylic acid and ethyl acrylate having improved effectiveness and mechanical shear stability. These polymers are useful as enteric coatings for solid pharmaceutical dosage forms such as tablets.

BACKGROUND OF THE INVENTION

Acrylic latexes of methyl methacrylate, ethyl acrylate, and methacrylic acid have been used in milkcan linings and paper coatings in the food-packaging industry since about 1950, and such dispersions were specified in the U.S. Federal Register for food additives in 1961. Copolymers of ethylacrylate and methacrylic acid for enteric coatings were developed by Lehmann and Dreker in "Anwendung wässriger Kunststoffdispersioner zum überzieken von Arzneiformen," Pharm. Inc., 34, 894–899 (1972).

Ethyl acrylate-methacrylic acid latexes can be prepared by emulsion polymerization. The emulsion polymerization mechanism of acrylate monomers with a hydrophilic methacrylic acid co-monomer is described by N. Sütterlin in "Structure/Property of Emulsion Polymers," Makromol. Chem. Suppl. 10/11, 403–418 (1985). For pharmaceutically useful polymethacrylates, the polymerization mechanism is described by K. Lehmann in "herstellung von Acrylharz-Filmtableten mit gesteuerter Winkstoffabgabe nach verschiedenen Sprühverfahren," APV-Informationdienst 18(1), 48–60 (1972).

Methacrylic acid-ethyl acrylate copolymer for enteric coatings is defined in U.S.P. XXII/NF XVII, U.S. Pharmacopeial Convention, Inc., 1990, as USP Methacrylic Acid Copolymer-Type C.

A 30% aqueous dispersion of the copolymer of ethyl acrylate and methacrylic acid is commercially available from Röhm GmbH, Darmstadt, Germany, under the tradename EUDRAGIT® L30D and is manufactured by emulsion polymerization of about 1:1 mole-ratio of methacrylic acid and ethyl acrylate; sodium lauryl sulfate and polysorbate 80 are used as the emulsifiers. The initiators are generally peroxygen compounds, which are chemically bonded to the polymers and are normally not found in substantial amounts in the final latex. The residual monomers can be either reduced or even eliminated by optimizing the polymerization process or by final steam distillation. Total residual monomer content in commercial EUDRAGIT® products is generally below 0.3%; normally less than 0.1% is found.

Effectiveness of a methacrylic acid-ethyl acrylate enteric polymer for coating of tablets generally depends on the rate of film forming during the coating of the tablet and the development of the cohesives film strength. When a methacrylic acid-ethyl acrylate emulsion polymer is used for enteric coating of pharmaceutical dosage forms, the polymer particles are deposited from an aqueous dispersion of discrete polymer spheres. Individual submicrometer-size spheres, each containing hundreds of polymer chains, coalesce into a continuous film as the water evaporates.

Kast describes the film formation mechanism for linear, non-crosslinking polymer particles in Makromol. Chem. Suppl. 10/11, 447 (1985). The film formation mechanism can be divided into three phases:

a) evaporation of water or drying;
b) coalescence and deformation of latex particles; and
c) cohesive strength development by the further gradual coalescence of adjacent latex particles and the interdiffusion of polymer chains from adjacent particles.

A conceptual visualization is depicted by Daniels et al., in Progress in Organic Coatings, 19, 359–378 (1991), as a latex dispersion consisting of spheres that are suspended and separated by electrostatic repulsion. As water evaporates, interfacial tension between water and polymer pushes particles into point contact in a close-packed ordered array. A strong driving force is necessary to overcome repulsive forces, deform the particles, and cause the spheres to fuse, thereby resulting in complete coalescence. Capillarity caused by the high interfacial surface tension of water provides the driving force to fuse the particles, and plasticizer inclusion in the dispersion swells and softens the polymer spheres, thereby facilitating coalescence and reducing minimum film-formation temperatures.

The polymer spheres are pulled closer together as a result of surface tension (water-air interfacial tension) or capillarity as the surrounding water film constricts. Energy required for the coalescence of spheres results from the surface tension of the polymer generated by the negative curvature of the particle surface and according to Dillon et al., in J. Colloid Science, 6, 108(1951) may be described by Frenkel's equation:

$$\Theta^2 = \frac{3\gamma^t}{2\pi r} \eta$$

where $\theta$ is one-half the angle of coalescence (contact angle) at time t; $\gamma$ is the surface or interfacial tension, r is the radius of a sphere and $\eta$ is the viscosity of the spheres.

This equation illustrates the inverse relationship between internal viscosity ($\eta$) of the spheres and the driving force ($\gamma$) necessary to fuse or coalesce discrete particles. Further, it is evident that smaller-radius polymer spheres require less driving force (capillarity) to completely fuse or coalesce.

On the microscopic or molecular level, once the polymer particles are in contact with one another, molecular interdiffusion of macromolecules from one particle into its neighbor occurs, and their entanglement takes place. The formation of entanglements between polymer chains of adjacent particles is crucial to the development of mechanical strength of the resulting films. Generally, higher molecular weight polymer chains develop better entanglement and, as a result, cohesive strength.

Thus an effective methacrylic acid-ethyl acrylate enteric polymer should ideally have smaller particle size and adequate lower molecular weight polymer chains for rate of film forming, and also have a small portion of slightly higher molecular weight polymer chains for developing cohesive film strength.

The use of EUDRAGIT® L30D for the enteric coating of tablets has been described by Lehmann in Acta Pharmaceutica Technologica, 31, 96–106 (1988); Dechesne et al. in J. Pharm. Belg. 37, 273–282 (1982); Belanger et al. in U.S. Pat. No. 5,047,258 (1991) and Patell et al. in U.S. Pat. No. 4,775,536 (1988).

It is generally believed that the consistency during the coating process and thereby the coating performance of a waterborne acrylate enteric coating on tablets is not fully satisfied. It would thus be desirable to develop an improved polymeric composition which will reduce the batch to batch variation.

Further, because the enteric polymers are subjected to mixing and mechanical shear throughout coating of pharmaceutical forms process, it would thus be desirable to develop a process for making enteric polymers with improved shear stability. Enteric polymers with improved shear stability are more user friendly during coating and will not plug the coating line during a coating process of pharmaceutical forms.

Film coatings are applied to pharmaceutical dosage forms to 1) facilitate the swallowing of the dosage form, 2) control the release of the drug by either protecting the drug from the gastric environment of the stomach or reducing potential gastric irritation caused by high localized drug concentration, 3) protect the drug from the storage environment, 4) improve the appearance, and 5) mask undesirable tastes, odors, and colors. Coatings are commonly applied from organic solutions of various polymers such as cellulose acetate phthalate (CAP) and hydroxypropyl methylcellulose phthalate (HPMCP). Because of environmental concerns and the increase in cost of suitable solvents, it is desirable to apply coating compositions via an aqueous medium.

An enteric coating is defined in USP XXII as a coating which is intended to delay the release of the medication until the dosage form has passed through the stomach. Enteric coated tablets are thus one type of delayed release dosage forms.

The following references provide general background information on enteric coating methodology:

*Drugs and the Pharmaceutical sciences, vol. 36: Aqueous Polymeric Coatings for Pharmaceutical Dosage Forms*, edited by J. M. McGinity, Marcel Dekker Inc, New York, N.Y., 1989.

*Handbook of Pharmaceutical Excipients*, Published by American Pharmaceutical Association, Washington, D.C., 214 (1986).

J. A. Seitz, "Aqueous Film Coating", *Encyclopedia of Pharmaceutical Technology*, vol. 1, edited by J. Swarbrick and J. Boylan, 337 (1988).

G. S. Banker and G. E. Peck, "The New, Water-Based Colloidal Dispersions," *Pharmaceutical Technology*, 5(4), 55-61 (1981).

R. E. Pondell, "From Solvent to Aqueous Coatings," *Drug Development and Industrial Pharmacy*, 10(2), 191-202 (1984).

M. B. Davis, G. E. Peck, and G. S. Banker, "Preparation and Stability of Aqueous-Based Enteric Polymer Dispersions" *Drug Development and Industrial Pharmacy*, 12(10), 1419-1448 (1986).

F. Gumowski, E. Doelker, and R. Gurny, "The Use of a New Redispersible Aqueous Enteric Coating Material," 11(2), 26-32 (1987).

R. K. Chang, C. H. Hsiao, and J. R. Robinson, "A Review of Aqueous Coating Techniques and Preliminary Data on Release from a Theophylline Product," 11(3), 56-68 (1987).

The common methods of eliminating or minimizing organic solvents in a coating process for preparing pharmaceutical dosage forms include the following:

1. A coating system which employs a solution of coating polymer in a mixed organic and aqueous solvent system such as hydroxypropyl methylcellulose (HPMC) in ethanol/water. This method only partially eliminates the need for organic solvents.

2. A coating system which employs an aqueous solution of water-soluble film-forming polymer. This method is limited to water-soluble polymers such as methylcellulose (MC), hydroxypropyl cellulose (HPC), and HPMC. Another limitation is the need to remove a large amount of water during drying and coating processes.

3. A coating system which employs an aqueous solution of alkali salt of an enteric polymer such as sodium or ammonium salt of hydroxypropyl methylcellulose phthalate (HPMCP), polyvinylacetate phthalate (PVAP), or cellulose acetate phthalate (CAP).

U.S. Pat. No. 4,017,647 teaches a method for providing enteric coatings on solid pharmaceutical dosage forms in which enteric coatings are provided on solid dosage forms by coating the dosage forms with an aqueous solution of a polymeric substance having carboxyl groups in a water-soluble salt form and bringing thus coated dosage forms into contact with an inorganic acid to convert the polymeric substance into the acid form, which is insoluble in water.

U.K. Patent Application GB No. 2,057,876 teaches a method of preparing coated medicament-containing cores of a solid unit dosage form with an enteric coating. The coating was applied (e.g., in a coating pan) onto the medicament cores from an aqueous solution of a water soluble salt of a cellulose partial ester of a dicarboxylic acid, the aqueous solution being free from organic solvent, until an enteric coating around each medicament core had been built up. The salt may be a sodium or ammonium salt of HPMCP or CAP.

4. A coating system which employs the pseudolatex of a water-insoluble film-forming polymer. Pseudolatex is an aqueous colloidal dispersion of polymer which is, for practical purposes, indistinguishable from a true latex. However, it is prepared by employing a mechanical method of converting a pre-existing water-insoluble polymer into an aqueous colloidal dispersion.

U.S. Pat. No. 4,177,177 teaches a polymer emulsification process comprising intimately dispersing a liquified water insoluble polymer phase at a certain viscosity in an aqueous liquid medium phase (at a certain ratio and temperature) containing at least one non-ionic, anionic, or cationic oil-in-water emulsifying agent at a certain concentration in the presence of an emulsion stabilizer at a certain concentration selected from the group consisting of those hydrocarbons and hydrocarbyl alcohols, ethers, alcohol esters, amines, halides, and carboxylic acid esters which are inert, nonvolatile, water insoluble, liquid, and contain a terminal aliphatic hydrocarbyl group of at least about 8 carbon atoms and mixtures thereof, and subjecting the resulting crude emulsion to the action of comminuting forces sufficient to enable the production of an aqueous emulsion containing polymer particles averaging less than 0.5 micron in size. This patent teaches that the disclosed polymer emulsification process is carried out at a temperature of about 40° C. to 90° C.

U.S. Pat. No. 4,330,338 teaches a coating composition for pharmaceutical dosages. The dosages use a set of FDA-approved polymers with a long history of pharmaceutical and food use. Pseudolatices containing such polymers are used to produce soluble, enteric, or sustained release coatings when the formulations are applied to dosage forms. Various other ingredients besides the polymers are taught to be required in the coating composition.

U.S. Pat. No. 4,462,839 teaches a process for making a polymeric powder which is readily dispersible in water to provide a composition useful for forming an enteric coating on pharmaceutical dosage forms, comprised of treating a freshly prepared spherical water-insoluble enteric polymer particles with a phosphate salt in an amount sufficient to minimize coalescence of particles during spray drying. U.S. Pat. No. 4,518,433 teaches a similar process except that acetylated monoglyceride is added to the dispersion before spray drying to produce the water-redispersible powder.

U.S. Pat. No. 5,025,004 discloses a process for preparing polymeric compositions which are suitable for coating medicaments or for use in cosmetic formulations and the novel compositions prepared therefrom. The process makes stable, colloidal, latex-like dispersions of coating polymers which can be readily dried to form polymeric powder materials. The process makes use of a novel combination of a water-in-oil emulsifier and an oil-in-water emulsifier.

5. A coating system which employs a true latex of film-forming polymer prepared by emulsion polymerization of acrylic or methacrylic monomers.

Emulsion polymerization is a complex empirical art since it usually involves more than four ingredients and often more variations in reaction conditions. J. Gardon wrote the following in "Emulsion Polymerization," in *High Polymers*, Vol. 29, Wiley, N.Y., 143 (1977):

"This latex technology has become a complex empirical art. Subtle modifications in the composition of the recipes or in the method of synthesis can cause commercially significant changes in the end products obtained from vinyl-type or ethylenic monomers."

Copolymers having a wide range of complicated structures for varying applications may be prepared through process design and choice of ingredients such as monomers, initiators, emulsifiers, and chain transfer agents in a emulsion polymerization. The final properties are greatly influenced by the choice of emulsifiers, the choice of initiators, the choice of other ingredients, the reaction temperature, and the method of monomer addition.

BRIEF DESCRIPTION OF THE DRAWING

FIG. 1 is a plot of the percent release versus time (minutes) of aspirin tablets coated with 10 percent by weight of the acrylic enteric polymer of Example 4 below.

SUMMARY OF THE INVENTION

The acrylate polymers of methacrylic acid and ethyl acrylate of the present invention are prepared by a semi-continuous emulsion polymerization process. Weight average molecular weights of the described acrylate enteric polymers are between 140,000 to 280,000, and have a polydispersity of 2.5 to 10.0 ($M_W/M_N$). The described acrylate enteric polymers are monodispersed with mean particle size less than 0.15 microns and standard deviation less than 0.045. The polymer composition is stable and insoluble in the acidic aqueous medium with a pH value ranged from 1.0 to about 5.0 but soluble in the aqueous medium with a pH greater than about 5.5. The polymer is particularly suitable for use as an enteric coating which protects the dosage form on the gastric environment, but release the drug in the small intestines.

The process for making acrylic based enteric polymers with improved shear stability in the present invention is a semi-continuous emulsion polymerization, comprising: (1) 0.1 to 0.6% of sodium lauryl sulfate NF, (2) 0.4 to 1.0% of polysorbate 80 NF, polyoxyethylene (20) sorbitan monooleate (3) 10.0 to 20.0% of ethyl acrylate, (4) 10.0 to 20.0% of methacrylic acid, (5) 0 to 1.0% of isopropyl alcohol USP, (7) 60.0 to 75.0% of distilled or deionized water, and (8) a redox initiator selected from peroxygen compounds such as potassium persulfate or ammonium persulfate and a reducing agent such as iron II sulfate hepta hydrate.

DETAILED DESCRIPTION OF THE INVENTION

The present invention provides a process for preparing an acrylic polymer of methacrylic acid and ethyl acrylate comprising reacting (a) about 0.1 to 0.6 weight percent of sodium lauryl sulfate;
(b) about 0.4 to 1.0 weight percent of polysorbate 80 polyoxyethylene (20) sorbitan monooleate;
(c) about 10 to 20 weight percent of ethyl acrylate;
(d) about 10 to 20 weight percent of methacrylic acid;
(e) about 0 to 1.0 weight percent of isopropyl alcohol;
(f) about 0.02 to 0.2 weight percent of monothioglycerol or cysteine hydrochloride;
(g) about 60 to 75 weight percent of distilled or deionized water; and
(h) about 0.02 to 0.15 weight percent of an initiator selected from the group consisting of sodium persulfate, potassium persulfate, ammonium persulfate, hydrogen peroxide, lauryl peroxide, benzoyl peroxide and optionally a compound selected from the group consisting of sodium bisulfite, sodium metabisulfite, sodium dithionate, sodium formaldehyde sulfoxylate, ascorbic acid and salts of $Fe^{+2}$;

at a temperature of about 30° C. to 85° C.

The choice of emulsifier is probably the most important factor in designing an emulsion polymerization. In this invention, food grade emulsifiers sodium lauryl sulfate NF and polysorbate 80 NF polyoxyethylene (20) sorbitan monooleate are used in the ranges between about 0.1 to 0.6% and 0.4 to 1.0%, respectively. The preferred ranges for sodium lauryl sulfate is 0.15 to 0.4%, and for polysorbate 80 NF polyoxyethylene (20) sorbitan monooleate is 0.5 to 0.8%.

Initiators used in this invention are peroxygen compounds such as persulfates of sodium, potassium, or ammonium, hydrogen peroxide, t-butylhydroperoxide, cumene hydroperoxide, lauryl peroxide, benzoyl peroxide, and persulfate compounds are preferred at a concentration between 0.02 to 0.15% in the emulsion. Redox initiators such as combination of peroxygen compounds with sodium bisulfite, sodium methabisulfite, sodium dithionate, sodium formaldehyde sulfoxylate, ascorbic acid and divalent iron salts; the total concentrations of the peroxygen compound/reductant/metallic compound are between 0.02 to 0.15% in the emulsion.

Reaction temperature is generally related to the type and concentration of emulsifiers and initiators used in the emulsion polymerization. Reaction temperatures in this invention are in the range of about 30° C. to 85° C., preferably between 60° C. and 85° C.

Methacrylic acid-ethyl acrylate enteric polymers are pH sensitive polymers; i.e., their solubility increases with pH value through neutralization of carboxylic acid functional groups. The range of compositions prepared from methacrylic acid and ethyl acrylate can be varied quite widely, but an approximate 1:1 ratio has been found to provide a highly effective enteric coating for pharmaceutical products.

As noted above, a more effective methacrylic acid-ethyl acrylate enteric polymer should have smaller particle size and adequate lower molecular weight chains for rate of film forming, and also have a small portion of slightly higher molecular weight polymer chains for developing cohesive film strength. Thus, development of a process for making methacrylic acid-ethyl acrylate enteric polymer with smaller particle size and a certain range of molecular weight distribution is desired. More specifically, mean particle size ranges from 0.07 to 0.15 microns, and 0.09 to 0.13 microns is preferred. Standard deviation of particle size distribution ranges from 0.015 to 0.045 and 0.019 to 0.035, i.e. mono-disperse particle size is preferred. Weight average molecular weight ranges from 140,000 to 280,000; and 160,000 to 250,000 is preferred. Polydispersity of a regular free-radical initiated emulsion polymer is about 2 to 4; however, the methacrylic acid-ethyl acrylate enteric polymers of the present invention exhibit polydispersity of 2.5 to 10.0, and the preferred range is 3 to 6.

Mercaptans such as dodecyl mercaptan and t-butyl mercaptan, and halogenated compounds such as carbon tetrabromide and bromodichloromethane are often used to regulate molecular weight of emulsion polymers for industrial applications. These compounds, however, are rather toxic and not suitable for developing pharmaceutical excipients. We have found that isopropyl alcohol USP, monothioglycerol NF, and cysteine hydrochloride USP can be effectively used to regulate molecular weight of acrylic latexes for pharmaceutical applications. The preferred range for isopropyl alcohol is between about 0 to 1.0 %, most preferably 0.1 to 0.4%; for monothioglycerol NF or cysteine hydrochloride USP the range is preferably between about 0.02 to 0.2%, most preferably 0.02 to 0.1%.

Batch processes and semi-continuous processes may be utilized in the practice of this invention; preferably a semi-continuous process is used. In the semi-continuous process, the composition of the feed and the initial charge in the reactor can be varied. The preferred method of feeding program involves feeding monomer/emulsifier/water pre-emulsion into a reactor containing a small portion of monomers and emulsifiers.

Because of the enteric polymers are subjected to mixing and mechanical shear action during a coating application of pharmaceutical forms, it would therefore be desirable to develop a process for making enteric polymers with improved shear stability. Mechanical shear stability is usually achieved by careful selection of the types and concentrations of emulsifiers, as described in Emulsion Polymers and Emulsion Polymerization, ACS Symposium Series 165, American Chemical Society, Washington D.C., 1981, pp. 171-188. This will require changing emulsifiers and its concentrations to better shear stability. However, a process for improving mechanical shear stability of copolymers of methacrylic acid and ethyl acrylate, without changing concentrations and types of emulsifiers, has been developed through developing a method to prepare latexes with preferential charge or methacrylic acid distribution toward shell of the latex particles. Thus, a portion of methacrylic acid is saved from the making of the pre-emulsion in the first step, and the saved methacrylic acid is then mixed back into the pre-emulsion and fed into the reaction vessel near the end of pre-emulsion feeding to create a methacrylic acid rich condition near the end of pre-emulsion feeding, and subsequently preparing latexes with preferential charge or methacrylic acid distribution toward shell of the latexes. This enhanced anionic charge through preferential distribution of methacrylic acid toward shell of the latex particles is believed to improve mechanical shear stability of the latexes.

Thus, as a further aspect of the present invention, there is provide a process for preparing an enteric polymers of methacrylic acid and acrylate having improved mechanical shear stability and effectiveness, said process comprising forming a pre-emulsion portion in the first step, said pre-emulsion comprising the following components:

(a) about 0.05 to 0.4 weight percent of sodium lauryl sulfate;

(b) about 0.1 to 0.6 weight percent of polysorbate 80 polyoxyethylene (20) sorbitan monooleate;

(c) about 14.0 to 30.0 weight percent of distilled or deionized water;

(d) about 10.0 to 20.0 weight percent of ethyl acrylate;

(e) about 10.0 to 20.0 weight percent of methacrylic acid;

(f) about 0.0 to 1.0 weight percent of isopropyl alcohol, or 0.02 to 0.2 weight percent of monothioglycerol or cysteine hydrochloride, or a mixture thereof; followed by charging a reaction vessel with the following:

(g) about 0.1 to 0.4 weight percent of sodium docusate;

(h) about 0.2 to 0.8 weight percent of polysorbate 80 polyoxyethylene (20) sorbitan monooleate;

(i) about 20.0 to 50.0 weight percent of distilled or deionized water;

(j) about 0.1 to 10.0 weight percent of ethyl acrylate;

(k) about 0.1 to 10.0 weight percent of methacrylic acid; and (l) about 0.02 to 0.15% of an initiator selected from the group consisting of sodium persulfate, potassium persulfate, ammonium persulfate, hydrogen peroxide, lauryl peroxide, benzoyl peroxide and optionally a compound selected from the group consisting of sodium bisulfite, sodium metabisulfite, sodium dithionate, sodium formaldehyde sulfoxylate, ascorbic acid and salts of $Fe^{+2}$;

followed by heating the reaction vessel to a temperature of about 30° C. to 85° C.; followed by feeding the pre-emulsion portion or co-feeding with a portion of initiator into said reaction vessel, until the pre-emulsion is about 60-95% fed into said reaction vessel, followed by mixing (m) about 0.1 to 2.0% of methacrylic acid, into said remaining pre-emulsion and feed into said reaction vessel, and continuing heating until the process is substantially complete.

As noted above, the acrylic polymers of the present invention are useful in coating compositions for tabletted medicaments. In this regard, the only limitation on the active ingredient in such medicaments is that it should be one which is intended to be absorbed through the small intestine. Accordingly, as a further embodiment of the present invention, there is provided a solid medicament coated with the acrylic polymer of the present invention.

The following examples will further illustrate the invention.

Experimental Section

EXAMPLE 1

The following example demonstrates that high molecular weight sample is obtained when effective chain transfer agents such as isopropyl alcohol USP, monothioglycerol NF, or cysteine hydrochloride USP are not used.

A semi-continuous emulsion polymerization was used to make the methacrylic acid-ethyl acrylate enteric polymer. Into a beaker were place with 3.5 g of sodium lauryl sulfate NF, 7.3 g of polysorbate 80 NF polyoxyethylene (20) sorbitan monooleate, 904.0 g of deionized water, 719.0 g of ethyl acrylate, and 747.4 g of methacrylic acid to make the pre-emulsion.

Into a 5-liter, 3-neck reactor were placed 8.1 g of sodium lauryl sulfate NF, 25.7 g of polysorbate 80 NF polyoxyethylene (20) sorbitan monooleate, 2239.0 g of deionized water, 34.5 g of ethyl acrylate, and 34.5 g of methacrylic acid. The reaction mixture was stirred and purged with nitrogen for 30 minutes, while raising the temperature to 75° C. then 40 g of 4% ammonium persulfate and 10.0 g of 0.5% iron II sulfate heptahydrate solutions were charged into the reaction vessel to initiate the copolymerization, followed by feeding the pre-emulsion and co-feeding 430 g of 0.56% ammonium persulfate solutions into the reaction vessel over a 160 minute period. Reaction temperature was maintained at 75°–80° C. for 3 hours. The emulsion was then cooled to 30° C. Weight average molecular weight was found to be 380,000 and polydispersity is 3.8. Total residual monomer concentration is less than 20 ppm. Particle size is 95 nm, and standard deviation 0.022.

EXAMPLE 2

The following example demonstrates that a mixture of isopropyl alcohol USP and monothioglycerol NF is effectively used to regulate molecular weight.

Into a beaker were place with 3.5 g of sodium lauryl sulfate NF, 7.3 g of polysorbate 80 NF polyoxyethylene (20) sorbitan monooleate, 904.0 g of deionized water, 719.0 g of ethyl acrylate, 747.4 g of methacrylic acid 15.0 g isopropyl alcohol, and 1.3 g of monothioglycerol NF to make a pre-emulsion mixture.

Into a 5-liter, 3-neck reactor were placed 8.1 g of sodium lauryl sulfate NF, 25.7 g of polysorbate 80 NF polyoxyethylene (20) sorbitan monooleate, 2239.0 g of deionized water, 34.5 g of ethyl acrylate, and 34.5 g of methacrylic acid. The reaction mixture is stirred and purged with nitrogen for 30 minutes, while raising the temperature to 75° C., then 40.0 g of 4% ammonium persulfate and 10.0 g of 0.5% iron II sulfate heptahydrate solutions were charged into the reaction vessel to initiate the copolymerization, followed by feeding the pre-emulsion and co-feeding 430 g of 0.56% ammonium persulfate solutions into the reaction vessel over a 160 minute period. Reaction temperature was maintained at 75°–80° C. for 3 hours. The emulsion was then cooled to 30° C. Weight average molecular weight was found to be 195,000 and polydispersity 6.4. Total residual monomer concentration is less than 20 ppm. Particle size is 121 nm, and standard deviation 0.025.

EXAMPLE 3

The following example demonstrates using monothioglycerol NF to effectively regulate the molecular weight.

A semi-continuous emulsion polymerization was used to make the methacrylic acid-ethyl acrylate enteric polymer. Into a beaker were placed 3.5 g of sodium lauryl sulfate NF, 7.3 g of polysorbate 80 NF, 904.o g of deionized water, 719.0 g of ethyl acrylate, 747.4 g of methacrylic acid, and 2.5 g of monothioglycerol NF to make the pre-emulsion.

Into a 5-liter, 3-neck reactor were placed 8.1 g of sodium lauryl sulfate NF, 25.7 g of polysorbate 80 NF polyoxyethylene (20) sorbitan monooleate, 2239.0 g of deionized water, 34.5 g of ethyl acrylate, and 34.5 g of methacrylic acid. The reaction mixture was stirred and purged with nitrogen for 30 minutes, while raising the temperature to 75° C., then 40.0 g of 4% ammonium persulfate and 10.0 g of 0.5% iron II sulfate heptahydrate solutions were charged into the reaction vessel to initiate the copolymerization, followed by feeding the pre-emulsion and co-feeding 430 g of 0.56% ammonium persulfate solutions into the reaction vessel over a 160 minute period. Reaction temperature was maintained at 75°–80° C. for 3 hours. The emulsion was then cooled to 30° C. Weight average molecular weight was found to be 210,000 and polydispersity 4.5. Total residual monomer concentration is less than 20 ppm. Particle size is 119 nm, and standard deviation 0,028.

EXAMPLE 4

The following example demonstrates that 31.4 g of methacrylic acid is saved in making the pre-emulsion after 90% of the pre-emulsion is fed into the reaction vessel. The saved 31.4 g methacrylic acid was mixed into the remaining pre-emulsion and continuously fed into the reaction vessel.

Into a beaker were placed 3.5 g of sodium lauryl sulfate NF, 7.3 g of polysorbate 80 NF polyoxyethylene (20) sorbitan monooleate, 904.0 g of deionized water, 719.0 g of ethyl acrylate, 716.0 g of methacrylic acid, and 2.5 g of monothioglycerol NF to make a pre-emulsion mixture.

Into a 5-liter, 3-neck reactor are placed 8.1 g of sodium lauryl sulfate NF, 25.7 g of polysorbate 80 NF polyoxyethylene (20) sorbitan monooleate, 2239.0 g of deionized water, 34.5 g of ethyl acrylate, and 34.5 g of methacrylic acid. The reaction mixture is stirred and purged with nitrogen for 30 minutes, while raising the temperature to 75° C., then 40.0 g of 4% ammonium persulfate and 10.0 g of 0.5% iron II sulfate heptahydrate solutions were charged into the reaction vessel to initiate the copolymerization, followed by feeding 90% of the pre-emulsion and co-feeding 430 g of 0.56% ammonium persulfate solutions into the reaction vessel oven a 145 minute period, then 31.4 g of methacrylic acid was mixed into the remaining 10% of the pre-emulsion and continuously fed into the reaction vessel over a 20 minute period. Reaction temperature was maintained at 75°–80° C. for 3 hours. The emulsion was then cooled to 30° C. Weight average molecular weight was found to be 200,000 and polydispersity 6.1. Total residual monomer concentration is less than 20 ppm. Particle size is 119 nm, and standard deviation 0.027.

EXAMPLE 5

The following example illustrates that 62.8 g of methacrylic acid is saved in making the pre-emulsion. After 80% of the pre-emulsion was fed into the reaction vessel, the saved 62.8 g of methacrylic acid was mixed into the remaining pre-emulsion and continuously fed into the reaction vessel.

Into a beaker were placed 3.5 g of sodium lauryl sulfate NF, 7.3 g of polysorbate 80 NF polyoxyethylene (20) sorbitan monooleate, 904.0 g of deionized water, 719.0 g of ethyl acrylate, 684.6 g of methacrylic acid, and 2.5 g of monothioglycerol NF to make the pre-emulsion.

Into a 5-liter, 3-neck reactor were placed 8.1 g of sodium lauryl sulfate NF, 25.7 g of polysorbate 80 NF, 2239.0 g of deionized water, 34.5 g of ethyl acrylate, and 34.5 g of methacrylic acid. The reaction mixture was stirred and purged with nitrogen for 30 minutes, while raising the temperature to 75° C., then 40.0 g of 4% ammonium persulfate and 10.0 g of 0.5% iron II sulfate heptahydrate solutions were charged into the reaction vessel to initiate the copolymerization, followed by feeding 80% of the pre-emulsion and co-feeding 430 g of 0.56% ammonium persulfate solutions into the reaction vessel over a 125 minute period, then 62.8 g of methacrylic acid was mixed into the remaining 20% of the pre-emulsion and continuously fed into the reaction vessel over a 40 minute period. Reaction temperature was maintained at 75°-80° C. for 3 hours. The emulsion was then cooled to 30° C. Weight average molecular weight was found to be 190,000 and polydispersity 6.2. Total residual monomer concentration is less than 20 ppm. Particle size is 136 nm and standard deviation is 0.025.

EXAMPLE 6

Mechanical shear stabilities are determined at 25° C. by a Waring high shear blender. In these tests, 200 ml of each sample from Examples 1–5 were placed into a Waring high shear blender at 25° C. using low speed. The time required for each sample to form coagulation is recorded in Table 1.

TABLE 1

| Sample | Time to form Coagulation |
| --- | --- |
| Example 1 | 3 min 50 sec |
| Example 2 | 4 min 0 sec |
| Example 3 | 4 min 40 sec |
| Example 4 | 5 min 45 sec |
| Example 5 | 7 min 0 sec |

Table 1 demonstrates that mechanical shear stabilities of Examples 4 and 5 are drastically improved.

EXAMPLE 7

This example illustrates the use of the methacrylic acid-ethyl acrylate enteric polymers prepared, as described in Examples 1 and 4 for coating solid dosage forms.

1. Preparation of coating dope: In a 2-gallon container, 338.0 g of USP grade talc was dispersed into 2092.0 g of distilled water. Mix 4670.0 g of the acrylic latex prepared in Example 1 or Example 4, 136.0 g of triethyl citrate, and 16.0 g of a food grade ANTIFORM 1520 from Dow Corning into the solution using a magnetic stirrer. After 30 minutes of mixing, the coating dope is ready for application to solid dosage forms.

2. The coating dope was employed for coating of aspirin tablets (10.5 mm in diameter, 400 mg per tablet). The coating was performed by spraying the dope on tablets in a Accela-Cota, 24" pilot production coater. Coating conditions are listed in Table 2. During the coating process, coated tablets were sampled at 8%, 10%, 12%, and 14% by weight of coating per tablet.

TABLE 2

| Coating Conditions | |
| --- | --- |
| Parameters | Operating Conditions |
| Batch Size | 10 kg |
| Pan Revolution | 14 rpm |
| Preheating and Dusting Time | 4–8 min |
| Drying Air Temperature | 80° C.–85° C. |
| Spraying Solution Feed | 54.0 ml/min |
| Bed Temperature | 30° C.–35° C. |

The coating process for Example 4 was completed without any problem such as blocking of spray gun, tablet stickiness, etc., during the process. Coated tablets were good and elegant in appearance. In contrast to the coating process for Example 1, the coatings proceed with some problems such as blocking of spray gun and plugging of coating line.

EXAMPLE 8

A modified USP enteric-coated tablet disintegration test specified in page 1578 of USP XXII/NFXVII, the United States Pharmacopeial Convention, Inc., Rockville, Md., 1990 was employed using the USP disintegration test apparatus (Pharma Test Type PTZ 3E) to assess the enteric efficiency of the coated aspirin tablets. These tablets were tested for 2 hours in simulated gastric fluid (pH=1.2) containing NaCl and HCl in water at 37° C. The tablets were then examined and recorded in Table 3. This table indicates the acrylic latex prepared in Example 4 is better.

TABLE 3

| | % Coating | | | |
| --- | --- | --- | --- | --- |
| | 8 | 10 | 12 | 14 |
| Example 1 | Fail | Fail | Fail | Pass |
| Example 4 | Fail | Pass | Pass | Pass |

Fail: evidence of disintegration
Pass: no evidence of disintegration

Those tablets showing no evidence of disintegration, cracking, or softening were then placed in a simulated intestinal buffer (pH=6.8) containing $KH_2PO_4$ and NaOH in water at 37° C. The disintegration time in the simulated intestinal buffer was less than 10 min for tablets coated with the acrylic latex prepared in Example 4 and more than 15 minutes for acrylic latexes prepared in Example 1. Fast disintegration in the simulated intestinal fluid is desirable.

Release of aspirin for tablets coated with 10% of the acrylic latex prepared in Example 4 was also evaluated using the USP (basket) Method I at 100 rpm with a Pharma Test Type PTWS. The percent of aspirin released corresponding to the time in a simulated intestinal fluid (pH =6.8) is shown in FIG. 1. It is noteworthy that 90% of aspirin was released within 30 minutes.

We claim:

1. A process for preparing an acrylic polymer of methacrylic acid and ethyl acrylate comprising forming a pre-emulsion portion in a first step, said pre-emulsion comprising the following components:
(a) about 0.05 to 0.4 weight percent of sodium lauryl sulfate;
(b) about 0.1 to 0.6 weight percent of polyoxyethylene (20) sorbitan monooleate;
(c) about 14.0 to 30.0 weight percent of water;
(d) about 10.0 to 20.0 weight percent of ethyl acrylate;
(e) about 10.0 to 20.0 weight percent of methacrylic acid;
(f) about 0.0 to 1.0 weight percent of isopropyl alcohol, or 0.02 to 0.2 weight percent of monothioglycerol or cysteine hydrochloride, or a mixture thereof followed by charging a reaction vessel with the following:
(g) about 0.1 to 0.4 weight percent of sodium docusate;
(h) about 0.2 to 0.8 weight percent of polyoxyethylene (20) sorbitan monooleate;
(i) about 20.0 to 50.0 weight percent of distilled or deionized water;
(j) about 0.1 to 10.0 weight percent of ethyl acrylate;
(k) about 0.1 to 10.0 weight percent of methacrylic acid; and
(l) about 0.02 to 0.15 weight percent of an initiator selected from the group consisting of sodium persulfate, potassium persulfate, ammonium persulfate, hydrogen peroxide, lauryl peroxide, benzoyl peroxide and optionally a compound selected from the group consisting of sodium bisulfite, sodium metabisulfite, sodium dithionate, sodium formaldehyde sulfoxylate, ascorbic acid and salts of $Fe^{+2}$; followed by heating the reaction vessel to a temperature of about 30° C. to 85° C.; followed by feeding the pre-emulsion portion or co-feeding with a portion of initiator into said reaction vessel, and continuing heating until the pre-emulsion portion is about 60–95% fed into said reaction vessel, followed by mixing
(m) about 0.1 to 2.0% of methacrylic acid into said the remaining pre-emulsion and feed into said reaction vessel, and continuing heating until the process is substantially complete.

2. The process of claim 1, wherein the initiator is sodium persulfate.

3. The process of claim 1, wherein the initiator is potassium persulfate.

4. The process of claim 1, wherein the initiator is ammonium persulfate.

* * * * *